United States Patent [19]

Stoller

[11] Patent Number: 5,519,520
[45] Date of Patent: May 21, 1996

[54] AC PLASMA ADDRESS LIQUID CRYSTAL DISPLAY

[75] Inventor: Ray A. Stoller, Paulding, Ohio

[73] Assignee: Photonics Systems, Inc., Northwood, Ohio

[21] Appl. No.: 194,278

[22] Filed: Feb. 8, 1994

Related U.S. Application Data

[63] Continuation-in-part of Ser. No. 76,923, Jun. 15, 1993, abandoned, which is a continuation of Ser. No. 840,209, Feb. 24, 1992, abandoned.

[51] Int. Cl.$^6$ .......................... G02F 1/1343; G02F 1/137; G09G 3/28; G09G 3/36
[52] U.S. Cl. ............................... 359/55; 359/84; 345/66; 345/89
[58] Field of Search ........................ 359/54, 55, 84; 345/37, 55, 60, 63, 66, 102, 213, 89

[56] References Cited

U.S. PATENT DOCUMENTS

| | | | |
|---|---|---|---|
| 4,896,149 | 1/1990 | Buzak et al. | 340/794 |
| 5,077,553 | 12/1991 | Buzak et al. | 340/794 |
| 5,128,782 | 7/1992 | Wood | 359/48 |
| 5,214,521 | 5/1993 | Kwon et al. | 359/54 |
| 5,221,979 | 6/1993 | Kim | 359/55 |

*Primary Examiner*—Anita Pellman Gross
*Assistant Examiner*—Huy Mai
*Attorney, Agent, or Firm*—Jim Zegeer

[57] ABSTRACT

A drive system for a matrix cross point addressing system comprises a first substrate having a transparent first linear electrode array thereon. A second substrate having a second linear electrode array thereon, oriented transverse of the first linear electrode array defines therewith a matrix of crosspoints. An array of insulating ribs on the second linear electrode array defines an array of channels and an ionizable gas medium fills the array of channels, each channel of the array being aligned with a transparent electrode of the first linear electrode array, respectively. A layer of electric field responsive material, such as a liquid crystal, is sandwiched between the transparent first linear electrode array and a dielectric layer. First circuit means applies a first pulse operating voltage to the first linear electrode array and second circuit means for applying second pulse operating voltage to said second electrode array so that the conjoint voltages at selected matrix cross-points (1) causes a discharge in the gas therebetween and forms a charge on the dielectric layer and change the state properties of said electric field responsive material, and (2) remove said charge to cause said material to revert to its initial state, the conjoint voltage applied to the electrodes at a selected site is varied to vary the size charge at selected discharge sites and vary the area of said electric field responsive material at said site which is effected by the charge stored on said dielectric layer.

38 Claims, 7 Drawing Sheets

AC PLASMA ADDRESS LIQUID CRYSTAL DISPLAY

REFERENCE TO RELATED APPLICATIONS

This application is a continuation-in-part of my application Ser. No. 08/076,923 filed Jun. 15, 1993, now abandoned, which is a continuation of my application Ser. No. 07/840,209 filed Feb. 24, 1992, now abandoned.

BACKGROUND AND BRIEF DESCRIPTION OF THE INVENTION

The present invention relates generally to matrix-type flat panel display systems, and more specifically to liquid crystal display systems and, still more specifically, to gas discharge addressed matrix-type liquid crystal display panels and, still more specifically, to matrix-type liquid crystal displays with improved gray-scale and/or color.

The invention is particularly directed to a matrix-type flat panel display comprised of an array of rows and columns of pixel elements and in which the brightness level of each pixel element can be modulated by modulating the physical size or area of each pixel element.

Two of the primary problems in electronic displays is that of addressing a large array of pixels and achieving gray-scale and color. Direct matrix addressing using row and column lines to identify and select each pixel is the simplest addressing technique; however, it inherently possesses cross-coupling such that (at a minimum) one-third of the addressing signal to turn on a pixel is applied to all off-pixels. Some display materials, such as gas discharge or light emitting diodes (LEDs) have a very high discrimination ratio on an addressable matrix; that is to say, that one-third cross-coupling voltage is of no consequence. Other display materials have strong degree of required non-linearities, but not strong enough to be addressed in large matrices.

The degree of non-linearity is directly proportional to the number of rows scanned. Examples of materials are liquid crystal (LC) and electroluminescent (EL). To use these technologies, diodes, transistors or other highly non-linear elements are placed in series with the material to make an active matrix addressed display. In a typical active-matrix flat panel display, a semi-conductor process is used in making the display switches. Thin film transistors (TFT) active matrix and gas discharge switched pixel arrays have been suggested in the past. Their costs are intimately tied-up with yields and the proprietary manufacturing technologies. For thin film transistors, it is difficult to fabricate large quantities and large sizes with high production yields.

The present invention relates generally to a matrix-type flat panel display in which an AC plasma gas discharge system uses spatial modulation to control the gray-scale of a liquid crystal layer. Preferably the liquid crystal medium is one which is operable in an on-off (bi-level) mode where the total area of saturation is directly determined by the spatial area charged by the gas discharge contiguous or adjacent thereto. A charge storage surface such as a dielectric layer between a transparent electrode array, the LC medium and the gas medium stores a charge which is caused to spread in proportion to the amplitude of conjoint voltages at selected matrix cross-point. The charge spread area establishes a spatial or area size of the spot where the liquid crystal material changes state thereby providing spatial gray level of light transmission at the selected matrix cross-points. By using three Color channels (red, blue, green, for example), low cost, large screen multi-color display are attained.

A preferred embodiment of the invention comprises a layer of a liquid crystal (LC) display medium and a gas discharge matrix defined by rows and columns of discharge sites arranged and configured to areawise charge a matrix of area of a corresponding matrix of display pixel sites in the LC layer. The LC layer has viewing and non-viewing sides and a source of light illuminating the matrix of display pixel sites from the non-viewing side. The gas discharge matrix is of the AC discharge type wherein a first transparent substrate has a first electrode array thereon. A protective coating on the first electrode array is preferably a high resistance coating so as to isolate the first electrode array from the gas.

An array of non-conductive rib means defines channels or grooves filled with a gas discharge medium. A Penning mixture, such as neon and trace of a minority gas (argon, krypton, xenon, etc) and mixtures thereof. Light production by the discharge is not important. What is important is the formation of charges for storage on the discharge storage surface. The gas discharge medium fills the space between the array of ribs and a thin glass layer on the ribs serves as the dielectric charge storage surface, the size of the area of charge stored on the surface being a function of the amplitude of conjoint voltages and controls the spatial size of the spot where the liquid crystal material changes state.

The transparent layer of LC medium is preferably on the thin glass layer opposite the side contacting the array of ribs and, as noted above, the LC medium is, in the preferred embodiment, operated in an on-off (bi-level) mode where the total area of saturation is directly determined by the spatial area of the gas discharge adjacent thereto. A second transparent member or substrate, having an outer viewing surface and electrode bearing opposite surface has the transparent electrode array on the electrode bearing surface and the transparent electrode array is oriented transverse to the direction of the first electrode array so that the gas channels are aligned with the transparent electrodes. This alignment allows the discharge to spread (within predetermined limits to avoid cross-talk) and by adjusting the voltage, the charge on the dielectric layer is caused to spread in proportion to the amplitude of the conjoint voltages, the charge spread establishing the spatial size of the spot where the liquid crystal material changes state thereby providing spatial gray level of light transmissive point at selected matrix cross-points.

Color filters applied to the transparent electrodes provide a color display. It will be appreciated that the color filter can be conventional red, blue, green color filters with the size of the light spot or area of each light spot being adjusted to produce various combinations and hues of colors from the conventional three-color combination.

Alternatively, a color display can be achieved using the LCD active AC plasma assembly in a projection display in which synchronized color backlight is used in place of front color filters. In this embodiment, the active AC plasma panel provides in addition to eliminating the front color filtering, reduces the column drive electronics, has easier physical construction and manufacturing, and has a greater pixel fill factor and the active AC plasma panel provides a thermal buffer between the projection light sources and the LCD portion of the display.

DESCRIPTION OF THE DRAWINGS

The above and other objects, advantages and features of the invention will become more apparent when considered with the following specification and accompanying drawings wherein.

DESCRIPTION OF THE PREFERRED EMBODIMENTS OF THE INVENTION

Figure 1:
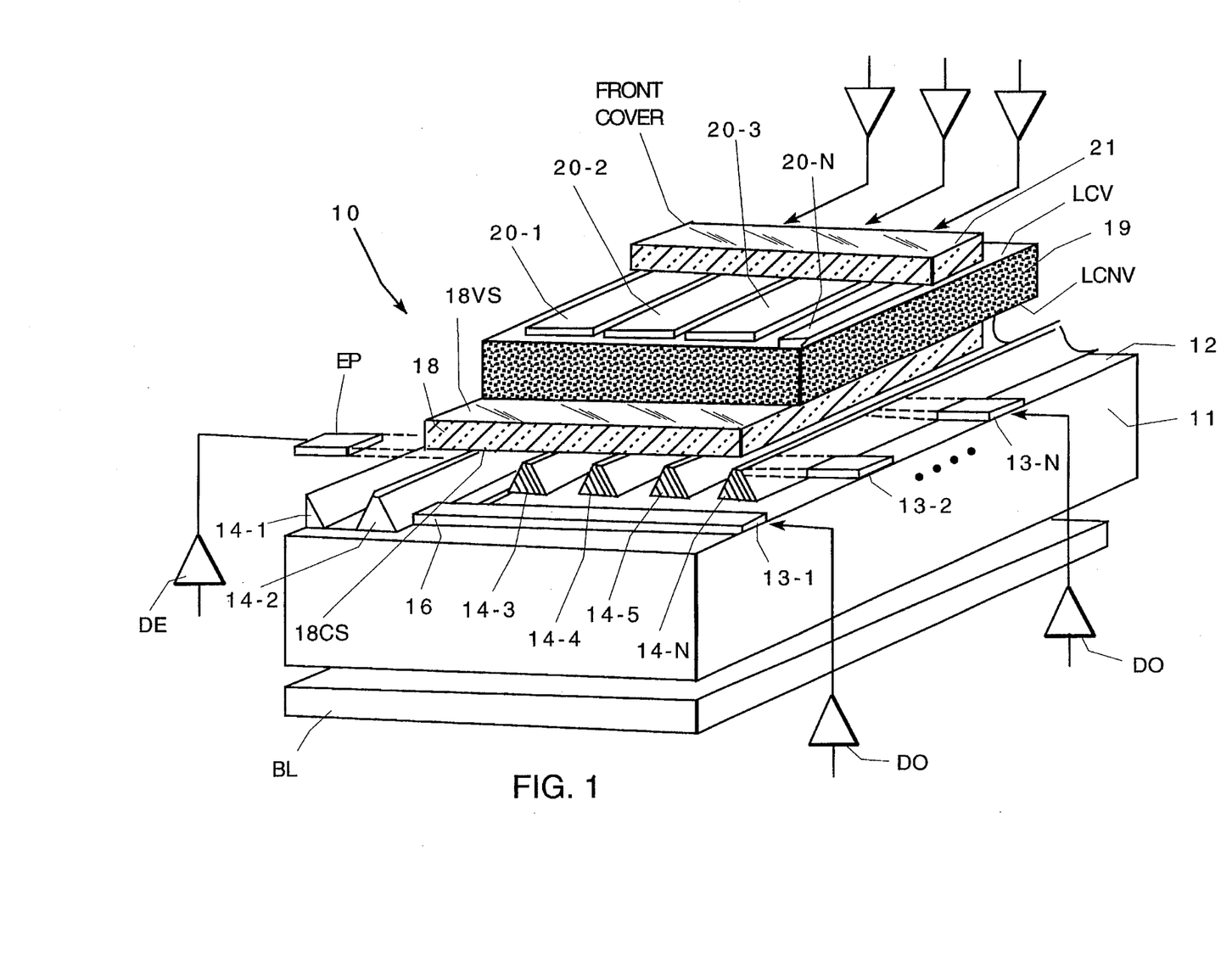
FIG. 1 is an enlarged cut-away perspective view a display panel incorporating the invention.
Figure 2:
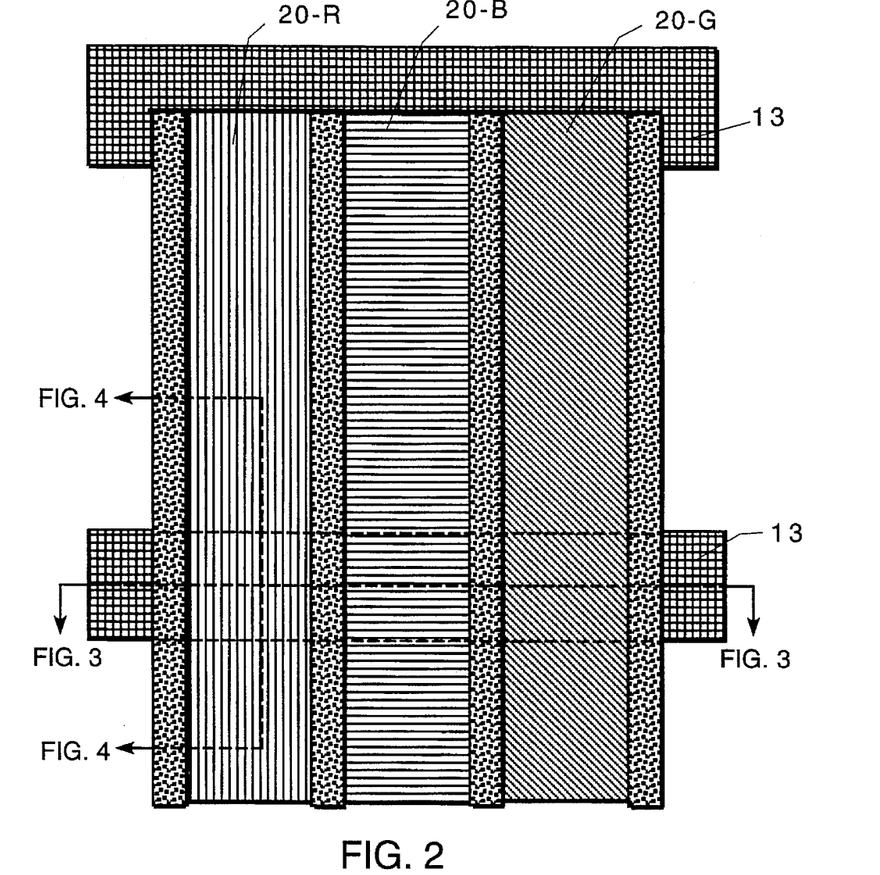
FIG. 2 is an enlarged partial top plan view diagrammatically illustrating the invention.
Figure 3:
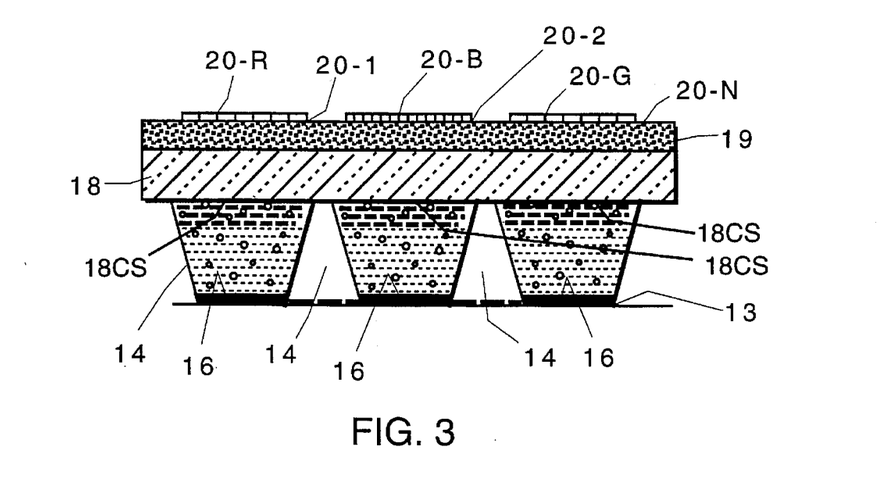
FIG. 3 is a sectional view along lines 3—3 of FIG. 2.
Figure 4:
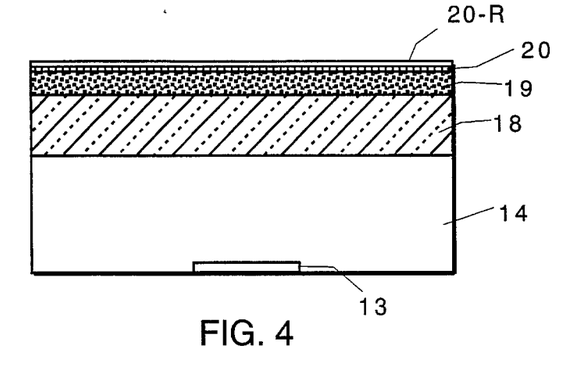
FIG. 4 is a sectional view along lines 4—4 of FIG. 2.

As shown in the cutaway enlarged perspective view of FIG. 1, a panel display device 10 incorporating the invention. A transparent support plate or member 11, preferably of glass, has a smooth surface 12 upon which are formed electrodes 13-1, 13-2 . . . 13-N which, in this embodiment, are in a linear electrode array 13. Electrode array 13 is applied in a conventional fashion as, for example, by thin-film deposition techniques such as an electron deposition process. Moreover, the surface may be treated in conventional fashion so as to assure good adherence and avoid delamination. For example, the surface underneath the electrode may be treated by a thin-film layer of tantalum or other electrode adherence promoting materials. In an exemplary embodiment of the invention, the center-to-center spacing for these electrodes may be about 255 micrometers (mm) and the width of the electrodes themselves may be about 50 micrometers. Even DE and odd DO drive sources connected are connected to electrode pads EP on the panel edges.

An array of ribs 14-1, 14-2, 14-3 . . . 14-N are spaced apart to form gas channels 15-1, 15-2, 15-3 . . . 15-N which are transverse to electrodes 13-1, 13-2, 13—3 . . . 13-N. Preferably, the ribs and channels are orthogonally related to electrode array 13. Ribs 14 can be formed by applying a layer of glass, for example, such as lead borosilicate glass having a thickness of about 100 micrometers on electrode array 13-1, 13-2, 13—3 . . . 13-N and thermally processed to form a smooth surface. A chemical milling process is used to form the ribs 14 and grooves or channel arrays 15. The chemical milling process including the resists are well known in the art and form no part of the present invention.

In the present invention, while a thin layer of glass may be left remaining on the electrodes 13, it is preferred that the electrodes 13-1, 13-2, 13—3 . . . 13-N be exposed in the chemical milling process so that a thin resistive layer 16 can be applied to electrodes in array 13 by a vacuum deposition process. For example, a mixture of magnesium oxide and gold (MgO and Au) can be applied to the glass ribs 14 and electrodes 13 in surface spaces so as to provide a resistive layer on electrodes 23 and, at the same time, protect the electrode from deterioration. The ribs 14 serve as spacer defining the discharge gap in the gas and, in the preferred embodiment, define the shape and direction of the sides of the discharge so that charge is not allowed to spread along the row conductor array 13. As will be shown later, this is also a physical constraint on the shape of the light spot produced at each pixel site. For panels where high resolution is not required, the spacing between ribs can be large to accommodate plural side-by-side discharges in the directions of electrode 13 without cross talk or addressing ambiguity. Edge connections to the electrodes are by conventional pads, such as gold pad EP for even row conductor 13-2.

Thin member 18 has a charge storage surface 18CS. In a preferred embodiment, charge storage member 18 is an ultra-thin glass layer. The charge storage surface 18CS can be overcoated with MgO to protect the surface from deterioration and its emissivity provider free electrons to minimize discharge start time. Ultra-thin glass sheets about 50 micrometers (μm) thick are available from various commercial manufacturers. It will be appreciated that ribs 14 may be formed on glass layer 18.

A thin layer 19 of liquid crystal material (which may be about 20 micrometers thick (μm)) is on the viewing side 18VS of charge storage member 18.

Transparent column electrode arrays 20-1, 20-2, 20-3 . . . 20-N are of transparent material such as indium tin oxide (ITO) and may be formed on the liquid crystal layer 19 of on an upper substrate 21. Edge terminations for these transparent electrodes are by edge pads (not shown). For color display panels, red 20R, blue 20B, green 20G filters may be formed over the transparent electrodes. It will be appreciated that the front cover substrate may be glass or plastic and that the filters and transparent column electrodes may be formed directly on the front cover plate 21 and sandwich the liquid crystal material 19 between the ultra-thin glass 18 and the transparent electrodes 20. Transparent column electrodes 20 are driven from column pulse supplies at alternate ends, e.g., even and odd electrodes connected at opposing panel ends.

The liquid crystal material layer 19 and the ultra-thin glass layer 18 form a dielectric layer for AC plasma operation. Note that voltage is divided across the respective material capacitances, said capacitances designed such that the "on voltage" and saturation voltage of the LC material are exceeded and the LC material is either clearly off or clearly on. It can be appreciated that the layer thicknesses of the dielectric composite layer may be adjusted to achieve different thresholds. Additional layers of other materials such as filters may also be introduced appropriate to the capacitive dividing requirements for correct operation.

The ultra-thin glass layer 18 is sealed all around its sides to the glass substrate 11 and a transverse gas channel TG and extending transversely to the direction of the gas channels 15 so as to provide gas equalization and a discharge (not shown) may be sustained in the gas equalization channel to provide conditioning for the gas in channels 15 much in the same fashion as in conventional AC plasma panels.

The liquid crystal material or layer 19 is preferably a continuous layer, has a viewing LCV side contiguous to the transparent electrode array and a non-viewing side LCNV contiguous to the viewing side of thin glass plate 19. If the liquid crystal material is on the front cover, it may be deposited on the indium tin oxide electrodes and the filters. The indium tin oxide column electrodes 20 may be formed on the liquid crystal layer or on the front cover. If the indium tin oxide is on the front cover, it should lay on the color filters so that the color filter capacitance is not in series with the normal pixel capacitance. The filters, (red, blue, green) color may be formed on the liquid crystal layer or on the front cover layer. The front cover layer 21 is sealed all around the sides to the plasma panel assembly. The indium tin column electrodes and the row electrodes extend beyond their respective substrates on which they are formed through the plasma panel assembly seal to allow external drive connections.

The liquid crystal material in this embodiment is polymer dispersed liquid crystal (PDLC) but, other liquid crystal materials such as FLC (ferroelectric liquid crystal), TNLC (twisted nematic LC), PNLC (polymer network LC), or DLC (Dichroic LC) could be utilized. It is preferred that the liquid crystal material have the following characteristics:

(1) high turn-on threshold voltage (i.e., about 20 volts),
(2) good saturation voltage characteristics (i.e., above turn-on voltage the liquid crystal material "on" state is constant),
(3) has a high break-down voltage (i.e., about 200 volts),
(4) has a high dielectric constant (i.e., low leakage characteristics), and
(5) has fast switching and relaxation times (i.e., is compatible with video frame rates equal to or greater than about 60 hertz.

It will be appreciated that the rear substrate can have light absorbing surface and the display can be operated by ambient light transmitted through front plate for a monochrome display.

The filters used in the front contiguous to the column electrodes depends on the type of liquid crystal material to be employed. If, for example, a TNLC-type liquid crystal is utilized, a polarizing filter layer (not shown), in addition to the pattern color filters is required. A polarizing filter layer (not shown) is required for a DLC-type crystal material with patterning i.e., coloring added to the liquid crystal material. For PDLC-type and PNLC-type liquid crystal materials, a pattern color filters is the only element required.

Figure 5:
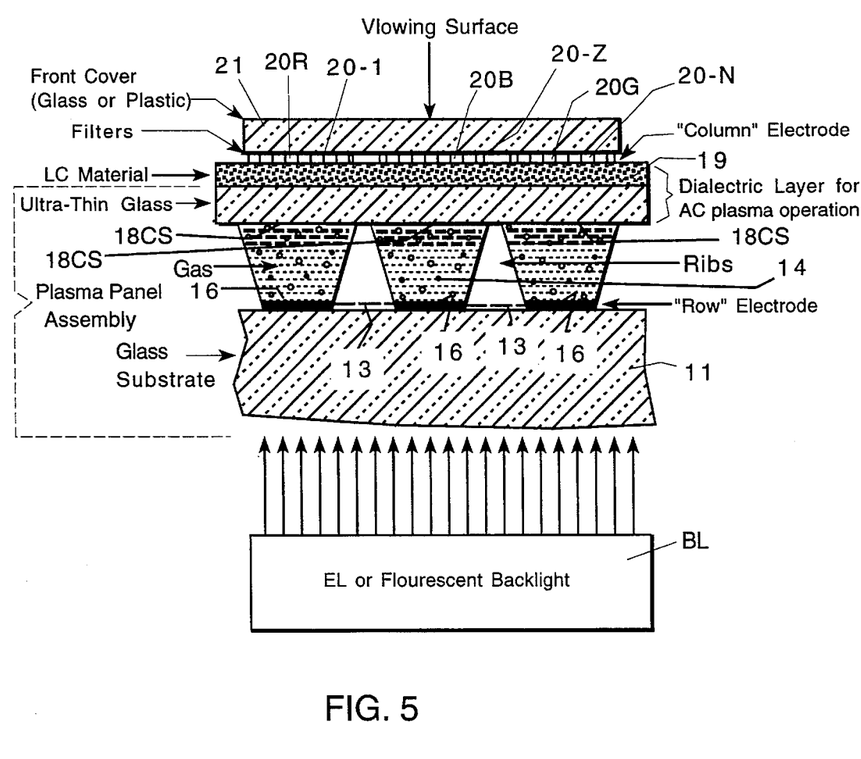
FIG. 5 is a diagrammatic sectional view illustrating the relationship of a planar light source to the invention.
Figure 6:
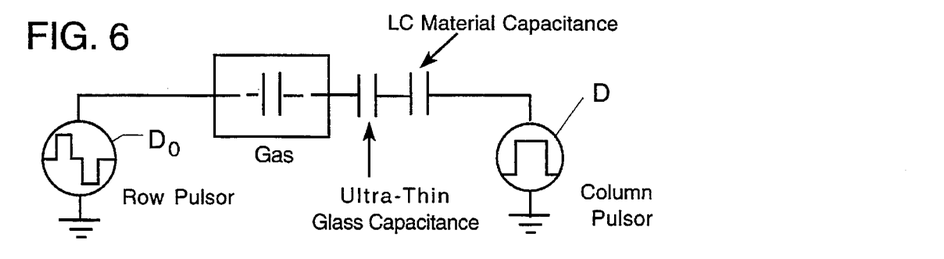
FIG. 6 illustrates the basic pixel cell drive component.

As shown in FIGS. 1 and 5, electroluminescent or fluorescent, as example, back light BL floods the entire rear substrate assembly 11 with white light. Other BL types are contemplated, including planar fluorescent.

GRAY-SCALE MODULATION

Figure 7:
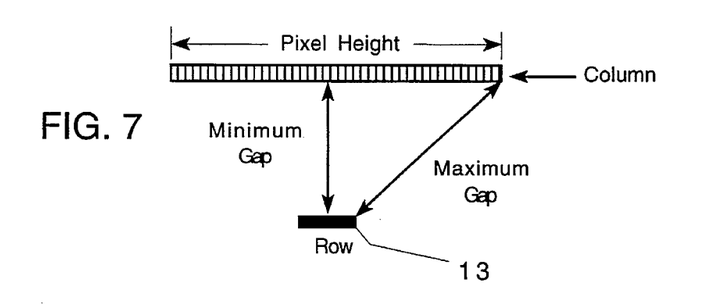
FIGS. 7, 8, 9 and 10 are diagrammatic illustrations for expanating presentation of the gray scale modulation features of the present invention (three channels of gray scale being present for the color presentations of FIGS. 8, 9 and 10)
Figure 8:
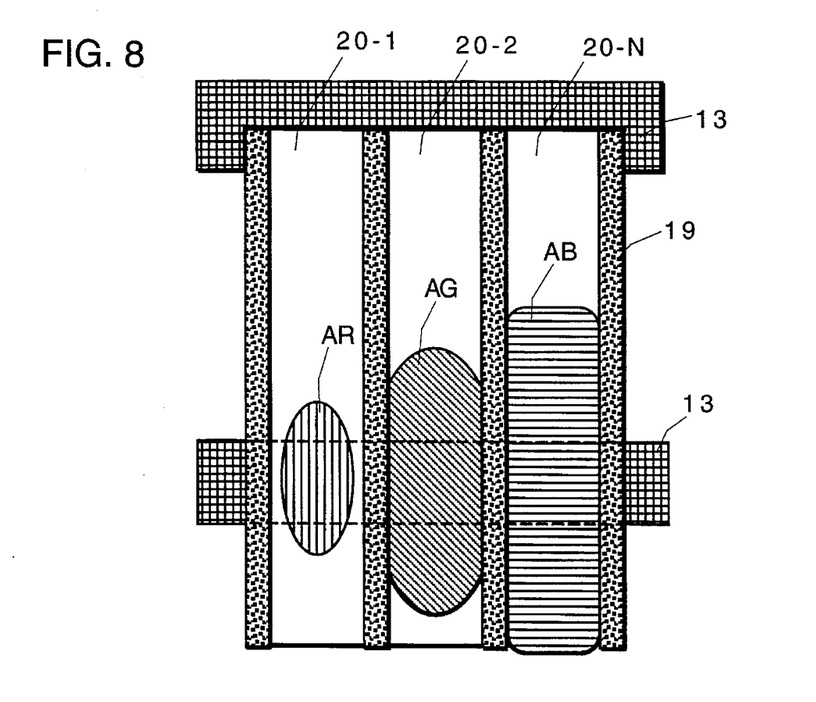
Figure 9:
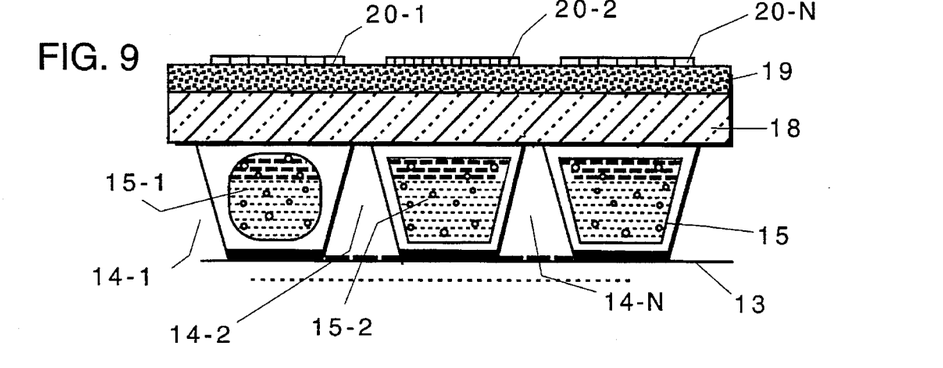
Figure 10:
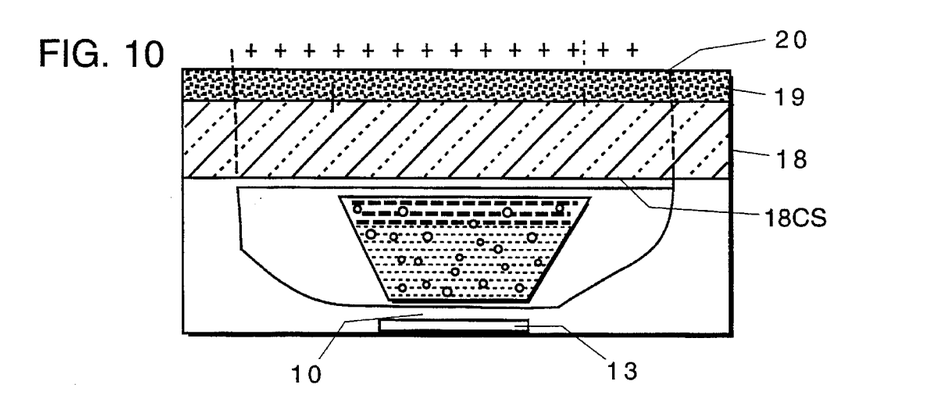

Referring to FIGS. 7, 8, 9 and 10, and FIGS. 11a, 11b and 11c, in FIG. 10, a column electrode CE and a row electrode RE are illustrated in transverse relation. (It will be appreciated that the term "row" electrode and the term "column" electrode are merely terms of reference and can be interchanged). It is known that the gas discharge voltage is directly proportional to the gap between electrodes, all other parameters being constant. In this invention, the spatial charge spread by the plasma is deposited on the charge storage surface 18CS along the column (anode) (transparent electrodes) until the voltage between the column and row electrodes is less than the gas discharge voltage. According to the present invention, the pixel gray-scale is directly determined by the spatial charge (wall voltage) under the liquid crystal material. Therefore, the pixel gray-scale is a function of the amplitude of the total applied voltage (the conjoint column and row potentials) applied to the pixel cell defined and located by the points of the row and column electrodes. The minimum pixel cell gap determines the minimum gray-scale level and the row voltage. The pixel height along column determines the maximum pixel cell gap, the maximum gray-scale level (full pixel brightness) and the maximum column modulation voltage. Furthermore, the row width electrode also affects the maximum gap as well as the minimum gray-scale (if it is opaque it shadows the back-light). These principles are reflected in the diagrammatic illustrations of FIGS. 7, 8 and 9. It will be noted that in the disclosed embodiment, the spacing between the column electrodes is approximately one-third the spacing between the row electrodes, e.g., three transparent column electrodes cross each row electrode. Thus, in this embodiment, the spacing between the center of the gap between a red, blue, green cluster is about 255 micrometers for a three electrode column cluster. In FIGS. 7,8 and 9, a discharge is shown as occurring between a row electrode 13 and each of column electrodes 20R, 20G and 20B, respectively. In the case of the matrix cross-point or pixel located by column electrode 20R and row electrode 13 the conjoint voltage applied to these electrodes produces a discharge in which the spatial charge spread by the plasma in a proportion determined by the amplitude of the total applied voltage, that is, the conjoint column, row electrode at the given instant of time as applied to the pixel cell 20R, 13. The charge collects on dielectric layer 18 with an area R. An intermediate conjoint voltage level is applied to the conjoint crossing of row electrode 13 and column electrode 20G and a substantially larger area of spatial charge (wall voltage is collected on the surface of dielectric 18 in the region indicated by the shaded area AG.

Finally, a larger voltage has been applied to the row electrode 13 and column electrode 20B to establish a still larger spatial charge area AB. The ribs forming the walls of the groove or channel limit the spread of the charge in the direction of the row electrodes so as to avoid cross talk and ambiguities. At the same time, the spacing between row electrodes 13 is large enough so as to avoid ambiguity or cross talk between adjacent row electrodes in pixel sites therealong. Pulse voltages of about 210 volts on the row electrodes 13 and variable amplitude pulse voltages on the column electrode 20 of about 60 volts are given as exemplary, but it will be appreciated that these can vary widely. For example, if the discharge gap, dielectric, etc., are changed, the operating voltage can change accordingly.

It will be appreciated that various combinations of areas of red, blue, green can be utilized to form a color pixel. For example, the area under column electrode 20R may be made large and the remaining areas substantially off so as to provide a full range of colors. It will be appreciated that the color filters may all be of one color or there may be no filters in which case it would be a monochrome display with extensive gray-scale range. In a monochrome display the backlight may be colored rather than white.

Referring now to FIGS. 6, and 11a, 11b and 11c, a basic pixel cell and its drive components are illustrated. Resistance 35 constitute the resistance material or layer on the row electrodes, capacitor 36 represents the capacitance of the gas cell, capacitor 37 represents the capacitance of the thin glass plate 18 and capacitor 38 represents the capacitance of the liquid crystal layer 19. A source of drive signals for the row electrodes is indicated by a row pulser circuit 39 and the column electrodes are driven by a column pulser circuit 40. The resistance material 35 provides isolation from the discharge of the row electrodes and thus avoids some coupling ambiguities and also the MgO coating thereon protects the electrode from the discharge and, at the same time, its emissivity provide free electrons to minimize discharge start time.

Figure 11A:
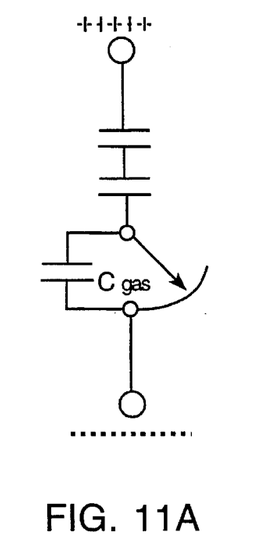
FIGS. 11a, 11b and 11c are diagrammatic illustrations of the "write", "hold" and "erase" sequences, respectively.

In the "write" stage illustrated in FIG. 11a, when the row voltage has zero potential i.e., has a high impedance or "off", there is no discharge even if there is a pulse voltage on the column electrode. That is, there is a positive amplitude modulation on the column electrode. When the row electrode is pulsed however with a negative pulse for example, and the column electrode is pulsed with a positive amplitude modulation pulse, the conjoint voltage (column and row) is applied on the gas, there is a discharge symbolized by the closing of the switch SW so that negative charges (electrons) moves to the charge storage surface 18LS wall and collects under the column electrode to form a wall voltage, the degree or spatial area of charge collection being determined by the amplitude of the conjoint voltages applied to the row and column electrode and positive moved to the row electrode. The MgO-Au overcoat isolates and protects the row electrode and, at the same time, allows the flow of positive charges so no charge builds up at the row electrode. In FIG. 11a, conventional current flows in the direction of the switch arrow.

At the end of the discharge, the amount of charge that builds-up on the surface of the dielectric layer 18, in a pixel area sense changes the state of the liquid crystal material to pass more or less light depending upon the surface area of the charge to allow more or less light from the backlight BL to be presented at the viewing surface.

Figure 11B:
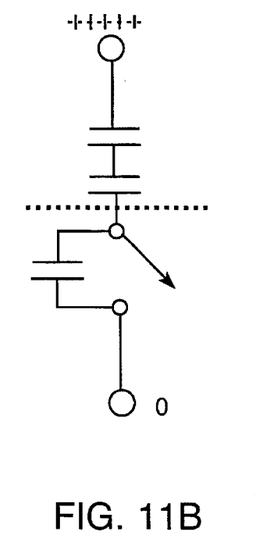

The negative wall charge increases to thus oppose the applied voltage across the gas and the discharge ends open, as shown in FIG. 11b. This is the "hold" state with the row voltage removed i.e., a high impedance or off. The column voltage continuous to be pulsed for other selected rows and the address voltage or charge holds across the capacitors 37, 38 as diagrammatically illustrated in FIG. 11b. This voltage is divided across capacitance 37, 38 and exceeds the "on voltage" and saturation voltages of the liquid crystal material to hold it on.

Figure 11C:
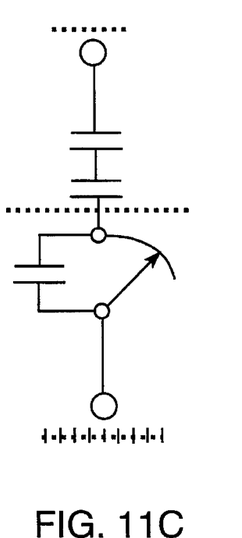

The "erase" sequence is illustrated in FIG. 11c. In this case, the column electrodes are pulsed with a negative amplitude modulation pulse and the row electrodes have a positive pulse applied thereto so that in this case, the pixel cell's wall voltage adds to the overall voltage across the gas i.e., reduces the row and column voltage proportionately so as to cause a discharge with current flow in the direction indicated by the switch area in FIG. 11c. The negative wall voltage is neutralized and the discharge ends. Both row and columns are grounded so that all capacitances at this state have zero volts across them to start the cycle over again.

It will be appreciated that in contrast to conventional AC plasma display panels, there is no sustainer voltage required and significantly lower power is required to operate the display.

Figure 12:
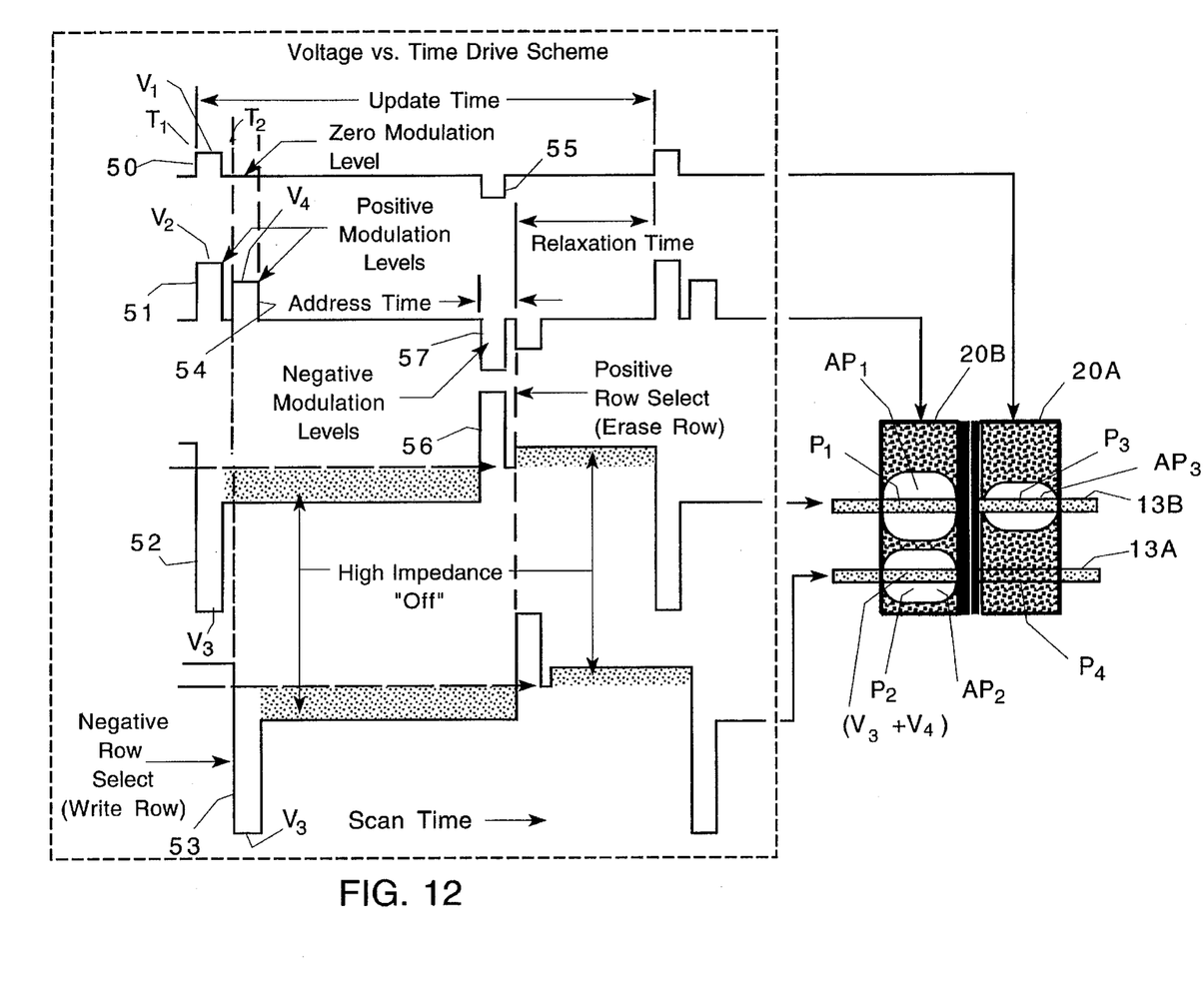
FIG. 12 is an exemplary illustration of drive waveforms timing for a four pixel or cell portion of a display panel incorporating the invention.

FIG. 12 illustrates the voltage time drive waveforms as applied to four cells or pixels on a panel 10 and illustrates the relative modulation levels needed to achieve various levels of gray and/or color. Two column electrodes 20A and 20B and two row electrodes 13A and 13B form a cluster of four pixel cells P1, P2, P3 and P4 and in this case, zero modulation level is ground level or zero voltage. Column electrode 20A has a positive pulse 50 of an amplitude V1 applied thereto whereas column electrode 20B has a positive potential applied at a level V2 which is larger than V1. At this time, row electrode 13B 52 of an amplitude V3 applied thereto. The conjoint voltages V1 and V3 are applied to the gas in pixel cell P3 to create a discharge resulting in an charge having an area AP3. Pixel P1, however, has a larger voltage V3+V2 applied thereto so that there is more intense charge collection in an area AP1. At this instance, there is no voltage on row conductor 13A so that the conjoint voltage at pixel P4 is V3 and ground or zero so that there is no discharge at pixel P4. However, at time T2 when there is no pulse voltage on column conductor 20A, there is a negative voltage 53 having an amplitude V3 and a positive column voltage 54 having an amplitude V4 so that there is a conjoint voltage at pixel site P2 having the voltage V3+V4 resulting in an intermediate size area discharge to produce an intermediate charge area coverage of AP3. It will be noted that because of the different voltage levels applied to the different pixels P1, P2 and P3, the spatial area covered by the charge on the dielectric charge storage member 18 varies accordingly to thereby provide gray-scale.

As diagrammatically illustrated earlier herein, three channels of gray-scale provide color (red, blue, green) channels for color. The row conductors are solid conductors and shadow the back light but since these are significantly narrow conductors, the decrease is minimal. This can be attended to by making the electrodes a minimum size and/or increasing their transparency.

The update time illustrated diagrammatically in FIG. 12, is a refresh time for purpose of relating to video display. However, refresh is not implicit since each pixel has charge storage (memory) to retain its state. The relax time equals the time for the liquid crystal material to return to a mechanical "off" orientation and this can be on tile order of one millisecond for polymer dispersed liquid crystal materials, for example. The minimum update time for the matrix display is the number of rows times two address time plus the relaxation time. For example, if the address time is 5 microseconds, and the number of rows is 1000, the relaxation time is about 1000 microseconds and the update time is 11,000 microseconds which is equal to 11 milliseconds and the update rate is about 90 updates per second. The address time includes electronic shifting, set up and hold time, gas discharge time and LC material switching time. The update speed can be reduced by reducing address time (i.e., increase drive electronics throughput), parallel row scans, (i.e., split the panel into two independent scan sections and reducing relaxation time by use of faster LC materials having the properties specified above. It can be appreciated that pixel-by-pixel frame rate modulation could be employed in combination with amplitude modulation of the present invention. Four bits of gray-scale (16 levels) plus two bits of frame rate results in 6 bits or 64 levels of gray-scale.

In order to erase, negative and positive pulses are respectively applied to the column and row electrodes. Note that erase voltage waveform 55 is negative as applied to column electrode 20A whereas the erase voltage 56 as applied to the row electrode 13B produces a conjoint voltage which includes the pixel cell wall voltage added to the overall voltage to reduce the row of column voltage proportionately so that the gas discharge with current flow in the direction indicated in FIG. 11a neutralizes the wall voltage and the discharge ends in turning that pixel off. Likewise, to turn off pixel AP1, a voltage 57 applied to column electrode 20B conjointly with the voltage 56 applied to row electrode 13B removes the wall voltage and turns the cell AP1 off. The address time includes electronic shifting, set up times and hold times, a gas discharge time and the liquid crystal material switching time. Instead of direct display, the invention can be applied as a light valve to subsequent display such as a projection screen.

Incorporation of the invention in projection displays has a particular embodiment that can employ a synchronized color backlight to eliminate the front color filtering. This embodiment has some additional important advantages, i.e., reduction in column drive electronics, easier physical construction, and greater pixel fill factor. Furthermore, this type of projection display should be inherently more reliable and less power dissipative than conventional schemes that must heavily filter and isolate the LCD shutters (i.e., light valves) from the light source. In this embodiment, the active plasma panel provides a thermal buffer between the light source and the LCD. The plasma panel is capable of operating very reliably in high thermal environments.

Figure 13:
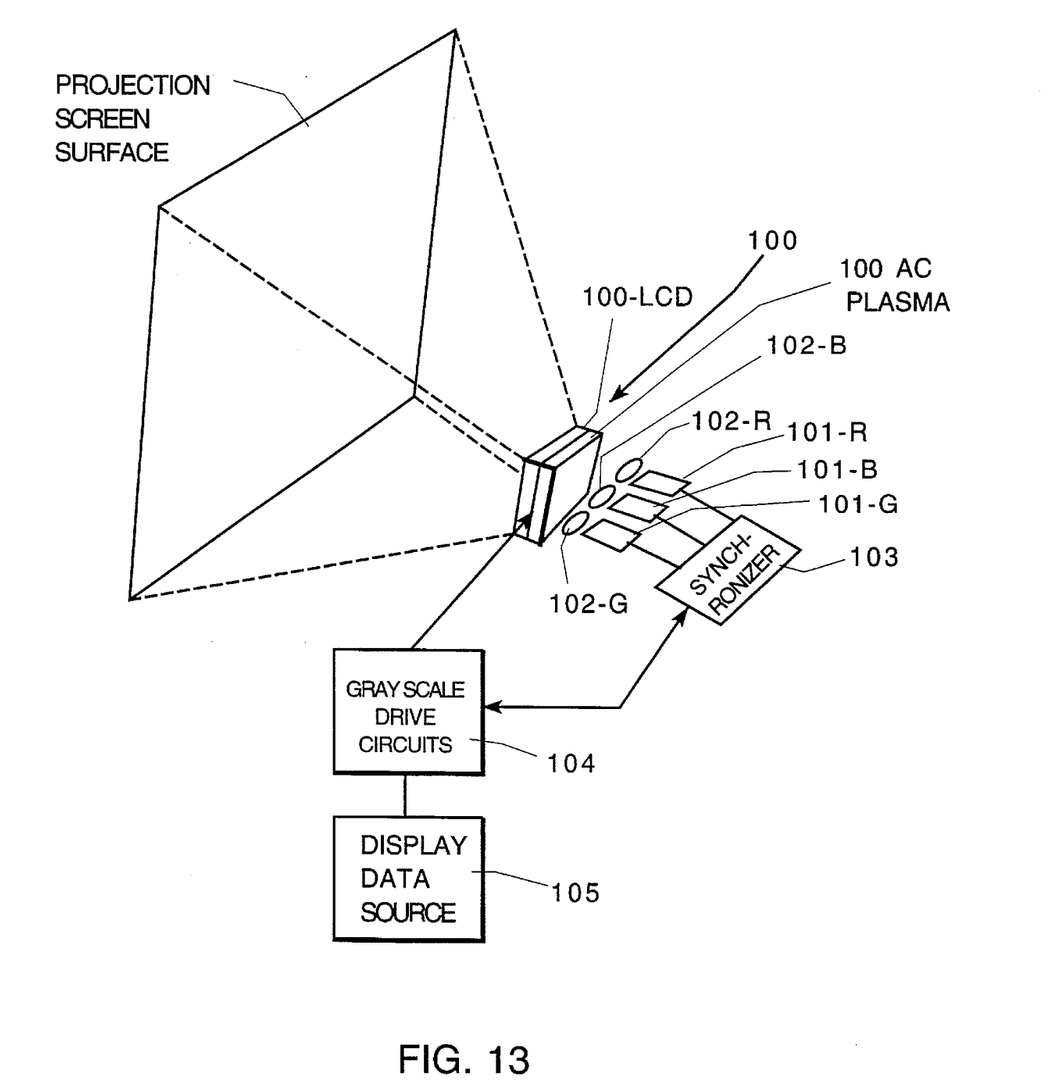
FIG. 13 is an exemplary illustration of the incorporation of the invention in a projection display system.

As shown in FIG. 13, in this embodiment of projection display light valve 100, the invention's pixel structure is changed essentially into a single monochrome structure as earlier explained, with the backlight providing colored light. However, the backlight provides red, green and blue flashes from sources 101-R, 101-G and 101-B, guided to a common projection path via collimation lenses 102-R, 102-G and 102-B, in synchronization, via synchronizer 103 receiving synchronizer signals from the gray scale drive circuits 104 which receives display data from source 105 with the single monochrome cell's gray scaling for each color flash in turn. Projection display light valve 100 is comprised of all LCD section 100LCD and an AC plasma section 100AC plasma. The monochrome cell's gray scaling is sequenced out of the drive circuit 104, frame buffer for each color contribution to the full color pixel. This embodiment results in only one-third the number of column drivers as before, and the panel is easier to construct because only one-third the number of channels need to be formed. The color/gray scale encoding is essentially the same as pointed out earlier where pixel-by-pixel frame rate modulation can be employed in combination with amplitude modulation to achieve more range in shading.

As described earlier, the display data source 105 can be one of a plurality of display data sources which are interfaced to the system, preferably using the invention disclosed in my application Ser. No. 07/943,170 filed Sep. 14, 1992, and the gray scale drive circuits can be of the type disclosed in my application Ser. No. 08/008,239 filed Jan. 21, 1993. So that the size of each pixel is controlled thereby.

The LCD material and row/column electronics must be sufficiently fast enough to support a scan rate of three times the previous embodiment. This is not a problem given the gains that have been made recently in LCD materials and drive electronics. The flashing backlight BL can be provided by conventional means in projection systems, including three separate electronically controlled lights as shown in FIG. 13, or a mechanical color wheel such as has been incorporated in the Texas Instruments DMD projection units. It can be appreciated that a direct view version of this embodiment is also possible, including in flat panel form if the color synchronized backlight can be flat-collimated directly on the plasma panel surface.

In a further embodiment, a three striped flat backlight could be employed to produce synchronized color flashes. For example, flat collimators or flat specular reflectors made from "light pipe" technology can be used with LCD's. These are micro-prismatic grooves formed on plastic sheet placed in front of the backlight. A three striped flat backlight could be fabricated as a standard three-phase bulk-sustained color AC-PDP.

It will be appreciated that touch panels of various kinds can be combined with the display of this invention.

While preferred embodiments have been shown and described, it will be appreciated that various adaptations, modifications and changes can be made without departing from the spirit and scope of the invention as defined in the claims appended hereto.

What is claimed is:

1. A display comprising a layer of liquid crystal material, said liquid crystal material having a relatively high turn on threshold, a good saturation characteristic, high break-down voltage, high dielectric constant and fast switching and relaxation times, a pair of transparent members sandwiching said layer of liquid crystal material, one of said transparent members having a charge storage surface, transparent electrode means on a first one of said pair of transparent members, means forming a charge on said charge storage surface and modulating the size of said charge on said charge storage surface, and means for applying a voltage to said transparent electrode for controlling light transmissive characteristics of said liquid crystal material.

2. The display defined in claim 1 wherein said means forming a charge includes an AC plasma discharge.

3. The display defined in claim 2 wherein said transparent electrode means is an array of transparent electrodes on said first one of transparent members, said liquid crystal material being contiguous to said transparent electrodes, said means forming a charge on one of said transparent members including a plurality of ionizable gas filled channels substantially aligned with said transparent electrodes, respectively, and said charge storage surface being contiguous to said ionizable gas filled channels, a further electrode array transverse to said ionizable gas filled channels, and means selectively supplying voltages to said electrode arrays such that conjoint voltages between intersections of said selected electrodes in said arrays discharges said gas to form said charges.

4. The display defined in claim 3 including means for selectively removing said charges.

5. The display defined in claim 4 wherein said means for removing said charges includes means for selectively applying reverse conjoint voltages to selected ones of said electrodes.

6. The display defined in claims 3 wherein said further electrode array has a protective coating thereon.

7. The display defined in claim 3 wherein the number of electrodes in said further electrode array is N and the number of transparent electrodes in said array of transparent electrodes is a multiple of N.

8. The display defined in claim 3 wherein said length of said charge is varied along said ionizable gas filled channel.

9. The display defined in claim 3 wherein said charge on said charge storage surface is caused to spread in proportion to the amplitude of conjoint voltages on selected electrodes of said arrays, said charge spread establishing the spatial size of spot where liquid crystal material changes state, thereby providing spatial gray level of light transmissive point at selected matrix cross points.

10. The display defined in claim 9 including means for selectively applying voltages to said arrays such that the conjoint voltage at a selected matrix cross point where a charge is present causes a discharge and tile removal of said charge.

11. The display defined in claim 10 wherein the spacing between electrodes in said further electrode array is sufficient to allow a predetermined amount of spreading without interfering with the spreading of charge from an adjacent matrix cross point located by the same ionizable gas filled channel.

12. The display defined in claim 3 including means for selectively removing said charges.

13. The display defined in claim 1 including filter means on said transparent electrode means.

14. The display defined in claim 1 wherein in said transparent electrode means is a array of transparent electrodes, sid display having a viewing and non-viewing sides and including red filter means on every third of said transparent electrodes, respectively, blue filter means on a further every third of said transparent electrodes, respectively, and green filter means on the remaining every third of said transparent electrodes, and a planar source of light projected through said display from said non-viewing.

15. The display defined in claim 1 wherein said protective coating includes a thin-film resistive material having high photoemissivity.

16. The display defined in claim 1, including a source of light of a predetermined color projecting through said layer of liquid crystal material and onto a remote display surface for viewing.

17. A display system comprising a layer of liquid crystal (LC) medium and a gas discharge matrix means defined by rows and columns of discharge sites for coupling operating potentials to a corresponding matrix of pixel display sites in said LC layer, said LC layer having viewing and non-viewing sides and a source of light illuminating said matrix of pixel display sites from said non-viewing side, said gas discharge matrix means including a first transparent substrate having a first electrode array thereon, a protective coating on said first electrode array and an array of rib means formed on said protective coating defining first lines of discharge sites in said gas discharge medium, a gas medium filling the space between said array of ribs, a thin glass layer on and spanning the space between said ribs, said layer of LC medium being on the surface of said thin glass layer opposite the side on said array of rib means, said LC medium being operated in a saturated, on-off (bi-level) mode where the total area of saturation is directly determined by the spatial area of the gas discharge adjacent thereto, a second transparent substrate having an outer viewing surface and an electrode bearing opposite surface, a transparent second electrode array on said electrode bearing surface and oriented transverse to the orientation of said first electrode array to define said rows and columns of discharge sites, said array of ribs being parallel to one of said transparent electrode arrays, means selectively supplying discharge potentials to said electrode arrays and initiate selective discharges at selected pixel display sites, and means for modulating the spatial area of each gas discharge to directly determine the amount of pixel level gray scale for each pixel display site in said matrix of pixel display sites.

18. The system defined in claim 17 including filter means on each electrode in said transparent second electrode array.

19. The display system defined in claim 18 wherein said filter means includes one or more color filters and said means for modulating includes a source of color information to be displayed.

20. The display system defined in claim 17 wherein said protective coating on said first electrode array is comprised of a resistive layer.

21. The display system defined in claim 17 wherein said protective coating on said first electrode array is a thin film mixture of magnesium oxide and gold.

22. The display system defined in claim 17 wherein said ribs are formed by chemically etching a glass layer on said first electrode array.

23. The display system defined in claim 17 wherein said first and second electrode arrays each have linear electrodes which are orthogonal to each other.

24. A matrix drive system for a liquid crystal display material comprising,
a first substrate having a transparent first linear electrode array thereon,
a dielectric layer,
a second substrate having a second linear electrode array thereon, oriented transverse of said first linear electrode array, to define a matrix of pixel cross-points,
an array of insulating ribs on said second linear electrode array and defining an array of channels and a gas medium filling said array of channels, each channel of said array being aligned with a transparent electrode of said first linear electrode array, respectively,
a layer of liquid crystal material between said transparent first linear electrode array and said dielectric layer,
first circuit means for applying first pulse operating voltage to said first linear electrode array and second circuit means for applying second pulse operating voltage to said second linear electrode array so that the conjoint voltages at selected matrix cross-points (1) causes a discharge in the gas therebetween and forms a charge on said dielectric layer and change the optical properties of said liquid crystal material at said selected matrix cross-points from an initial light transmissive state to a different light transmissive state and (2) remove said charge to cause said liquid crystal material to revert to its initial light transmissive state.

25. The matrix drive defined in claim 24 including means to vary the size charge at selected discharge sites and vary the physical size of the area of said liquid crystal material at said site which has its light transmissive state changed.

26. The matrix drive system defined in claim 25 wherein said means to vary includes means to vary the conjoint voltage applied to said electrodes at a selected pixel site.

27. The matrix drive system defined in claim 25 and including color filter means on said transparent electrodes.

28. The matrix drive system defined in claim 24 including optical filter means at each matrix cross point.

29. A drive system for a matrix cross point addressing system comprising,
a first substrate having a transparent first linear electrode array thereon,
a dielectric layer,
a second substrate having a second linear electrode array thereon, oriented transverse of said first linear electrode array, to define therewith a matrix of cross-points,
an array of insulating ribs on said second linear electrode array and defining an array of channels and a gas medium filling said array of channels, each channel of said array being aligned with a transparent electrode of said first linear electrode array, respectively,
a layer of electric field responsive material between said transparent first linear electrode array and said dielectric layer,
first circuit means for applying first pulse operating voltage said first linear electrode array and second circuit means for applying second pulse operating voltage to said second linear electrode array so that the conjoint voltages at selected matrix cross-points (1) causes a discharge in the gas therebetween and forms a charge on said dielectric layer and change the optical properties of said electric field responsive material at said selected matrix cross-points from an initial light transmissive state to a different light transmissive state and (2) remove said charge to cause said electric field responsive material to revert to its initial light transmissive state, and means to vary includes means to vary the conjoint voltage applied to said electrodes at a selected pixel site to vary the size charge at selected discharge sites and vary the physical size of the area of said electric field responsive material at said site which is effected by the charge stored on said dielectric layer.

30. The drive system defined in claim 29 including filter means at each matrix cross point.

31. The drive system defined in claim 30, said electric field responsive material being a liquid crystal and including color filter means on said transparent electrodes.

32. An electronic control device comprising a layer of material responsive to an electric field, a pair of transparent members sandwiching said layer of electric field responsive material, one of said transparent members having a charge storage surface, transparent electrode means on a first one of said pair of transparent members, means forming a charge on said charge storage surface and applying a voltage to said transparent electrode for controlling the electric field on said layer of material responsive to an electric field, and means for modulating the physical size of the area of said charge on said charge storage surface to thereby modulate the physical size of the area of said layer to which an electric field is applied.

33. The defined in claim 32 wherein said electrode is elongated along a selected axis and said means forming includes means for varying the length of said charge in a direction parallel to said selected axis.

34. The device defined in claim 33 wherein said means forming includes a AC plasma discharge.

35. In a liquid crystal display panel having a viewing side, a liquid crystal medium sandwiched between a pair of thin dielectric members, one of said thin dielectric members being transparent and constituting said viewing side and one of said thin dielectric members constituting a non-viewing side member, a transparent linear electrode array on said viewing side, thin dielectric members and having X number of display electrodes, a gas channel member having a plurality of discharge gas filled channels therein arrayed transversely relative to said linear electrode array, and with said gas filled channels abutting said non-viewing side member, the improvement comprising:

a further linear array of further electrodes aligned with said gas filled channels and isolated from direct electrical contact with the discharge gas in said channels, and circuit means for applying a voltage to selected ones of said transparent electrodes and said further linear array of further electrodes such that the combined voltages at each display pixel discharges the gas at said pixel and form a charged area on said non-viewing thin dielectric member and vary the light characteristic of the liquid crystal medium according to the physical size of said charged area.

36. An electronic control device comprising a layer of material responsive to an electric field, a pair of thin insulating members sandwiching said layer of electric field responsive material, one of said thin insulating members having a charge storage surface and one of said thin insulating members being transparent, transparent electrode means on the transparent insulating member, means forming a charge on said charge storage surface and applying a voltage to said transparent electrode for controlling the electric field on said layer of material responsive to an electric field, and means for modulating the physical size of the area of said charge on said charge storage surface to thereby modulate the physical size of the area of said layer to which an electric field is applied.

37. The display defined in one of claims 1, 17, 24 or 35, including a source of gray scale drive signals connected to said display and a source of light projecting through said layer of liquid crystal material and onto a remote display surface for viewing, and means synchronizing light from said source with gray scale signals from said source of gray scale drive signals for each pixel in the display.

38. The display defined in one of claims 1, 17, 24 or 35, including a source of gray scale signals connected to said display and a red, blue and green light source of light flashes positioned to project light through said display scale signals and means synchronizing said colored light flashes with the gray scale signals for each color flash, respectively.

* * * * *